ABSTRACT

United States Patent [19]

Strugatz

[11] Patent Number: 4,687,609

[45] Date of Patent: Aug. 18, 1987

[54] METHOD FOR CASTING POLYESTER ON GLASS MOLD

[76] Inventor: Arthur Strugatz, 256 Asharoken Ave., Northport, N.Y. 11768

[21] Appl. No.: 851,781

[22] Filed: Apr. 14, 1986

[51] Int. Cl.⁴ .................... B29C 33/38; B29C 33/42; B29C 39/12

[52] U.S. Cl. .................... 264/132; 264/219; 264/331.21; 264/337

[58] Field of Search ............. 264/219, 162, 337, 221, 264/331.21, 132; 65/61; 428/156; 249/103, 104, 140

[56] References Cited

U.S. PATENT DOCUMENTS

| | | | |
|---|---|---|---|
| 300,967 | 6/1884 | Harding | 264/219 |
| 1,888,344 | 11/1932 | Bon | 264/219 |
| 2,022,587 | 11/1935 | Cunningham | 264/162 |
| 2,147,770 | 2/1939 | Ford | 264/219 |
| 2,294,865 | 9/1942 | Frankenthal et al. | 428/156 |
| 2,879,617 | 3/1959 | Popeil | 264/337 |
| 3,533,889 | 10/1970 | Powell | 428/156 |
| 4,144,300 | 3/1979 | Breeden | 264/219 |
| 4,409,277 | 10/1983 | Michel | 264/1.1 |

*Primary Examiner*—James Lowe
*Attorney, Agent, or Firm*—Brumbaugh, Graves Donohue & Raymond

[57] ABSTRACT

Colored polyester pictures containing therein a design depicted by an integral raised beaded structure on a smooth, polished background are prepared by a method in which the polyester is cast on specially prepared glass molds. The glass mold is prepared by transferring a line drawing or design to a piece of glass covered with one-sided tape. Removal of the tape where the line drawing appears to expose the underlying glass, followed by blasting, results in a channel or gulley in the glass which, following casting becomes the beaded structure of the picture. The use of pigmented polyester for casting and painting the finished cast results in decorative artwork.

6 Claims, No Drawings

METHOD FOR CASTING POLYESTER ON GLASS MOLD

BACKGROUND OF THE INVENTION

This invention relates to a method of casting polyester on a glass mold to create a picture wherein a integral raised beaded structure forms a design in the cured polyester. By casting polyester mixed with appropriate pigments, followed by painting the cured polyester to achieve a desired effect of coloration, the present invention is used to create decorative artwork.

In recent years, there has been an increasing demand for artwork created from cast polyester for use with modern decorating schemes in home or commercial settings. Molded polyester pictures containing therein designs in the cast polyester are known in the prior art. Such polyester casts have been made using ceramic or rubber molds. A design cut into the mold is transferred in reverse polarity to the polyester cast from such molds. For example, a trough in the mold yields a raised structure in the finished cast.

Previously used mold materials, such as ceramic, rubber, or wood, however, do not result in a smooth surface in the finished cast product. The present invention, wherein the polyester is cast on a glass mold results in a cast structure with an extremely smooth polished surface.

SUMMARY OF THE INVENTION

It is an object of the present invention to provide a method of casting polyester on glass molds wherein the finished cast is suitable for use as decorative art. It is a further object of this invention to provide cast polyester pictures in which the design therein is depicted by an integral raised beaded structure and the background of the picture has a smooth polished surface.

These objects will become apparent in the following description and claims.

DESCRIPTION OF THE PREFERRED EMBODIMENTS

The glass mold of this invention is prepared by covering a suitably sized piece of glass in its entirety with one-sided tape. The size and shape of the glass to be used as a mold is dependent on what is desired for the finished product. Preferably, the one-sided tape is masking-tape used by painters to protect windows, etc. during house painting.

A prepared line drawing or other design on a sheet of paper is transferred to the tape covering the glass by tracing through carbon paper. This results in a line drawing or design on the tape. By use of an artist's sharp, pointed, razor-like knife or razor blade, the tape is removed from the glass only where the traced lines appear on the tape. The preferred instrument for removing the tape is an X-acto ® knife. Removal of the tape results in exposed glass bearing the drawing or design.

The piece of glass is then blasted with aluminum oxide under high pressure which creates a channel or gulley of the desired depth in the exposed glass leaving the glass under the tape smooth and unaffected. Such channels or gulleys will become the raised beaded structures in the final polyester cast.

The mold is then readied for casting by removing the remaining tape. A dam is built around the mold and a special wax is applied to the glass plate to allow release of the cast polyester. A liquified polyester mixture containing a pigmented dye appropriate to achieve a desired coloration is then poured onto the prepared glass mold.

The colored polyester is allowed to harden and cure and is then removed from the glass mold. A smooth, polished surface to the cast polyester is obtained. To obtain a desired artistic effect, the design demarcated by the integral raised beaded structure is then painted with special paints suitable for use on polyester. The polyester picture so obtained is then suitable for framing and mounting on a wall.

I claim:
1. A method for casting polyester on a glass mold to create artwork which comprises:
   (a) preparing a glass mold wherein a piece of glass is covered in its entirety with one-sided tape;
   (b) transferring a line drawing or design from paper to the tape;
   (c) removing the tape only in the area where the line drawing or design appears on the tape such that the underlying glass becomes exposed;
   (d) blasting the glass mold so prepared such that a channel or gulley forms where the glass is exposed; and
   (e) casting polyester containing an appropriate pigment on the glass mold so prepared such that an integral raised beaded structure depicting the line drawing or design is formed on the cast polyester in the precise configuration of the channel or gulley formed in the glass mold and the polyester so cast has a smooth polished surface.

2. A method for casting polyester on a glass mold according to claim 1 wherein the line drawing or design is transferred to the tape from a prepared line drawing or design on paper by tracing through carbon paper.

3. A method for casting polyester on a glass mold according to claim 1 wherein the tape is removed by use of an artist's sharp, pointed razor-like knife.

4. A method for casting polyester on a glass mold according to claim 1 wherein the blasting step to create the channel or gulley in the glass mold uses aluminum oxide under high pressure.

5. A method for casting polyester on a glass mold according to claim 1 further comprising building a dam around the prepared mold and applying a special wax to allow for release of the cast polyester product.

6. A method according to claim 1 further comprising decorating the cast polyester by painting areas demarcated by the integral raised beaded structure to obtain a desired artistic effect of coloration.

* * * * *